(No Model.) 2 Sheets—Sheet 1.

J. & D. DE P. A. OUTCALT.
ELECTRIC GRAIN WEIGHING SCALE.

No. 511,647. Patented Dec. 26, 1893.

Witnesses
Harry L. Amer.

Inventors
John Outcalt
David De Pyster Acker Outcalt.
By their Attorneys,
C. A. Snow & Co.

(No Model.) 2 Sheets—Sheet 2.
J. & D. DE P. A. OUTCALT.
ELECTRIC GRAIN WEIGHING SCALE.
No. 511,647. Patented Dec. 26, 1893.
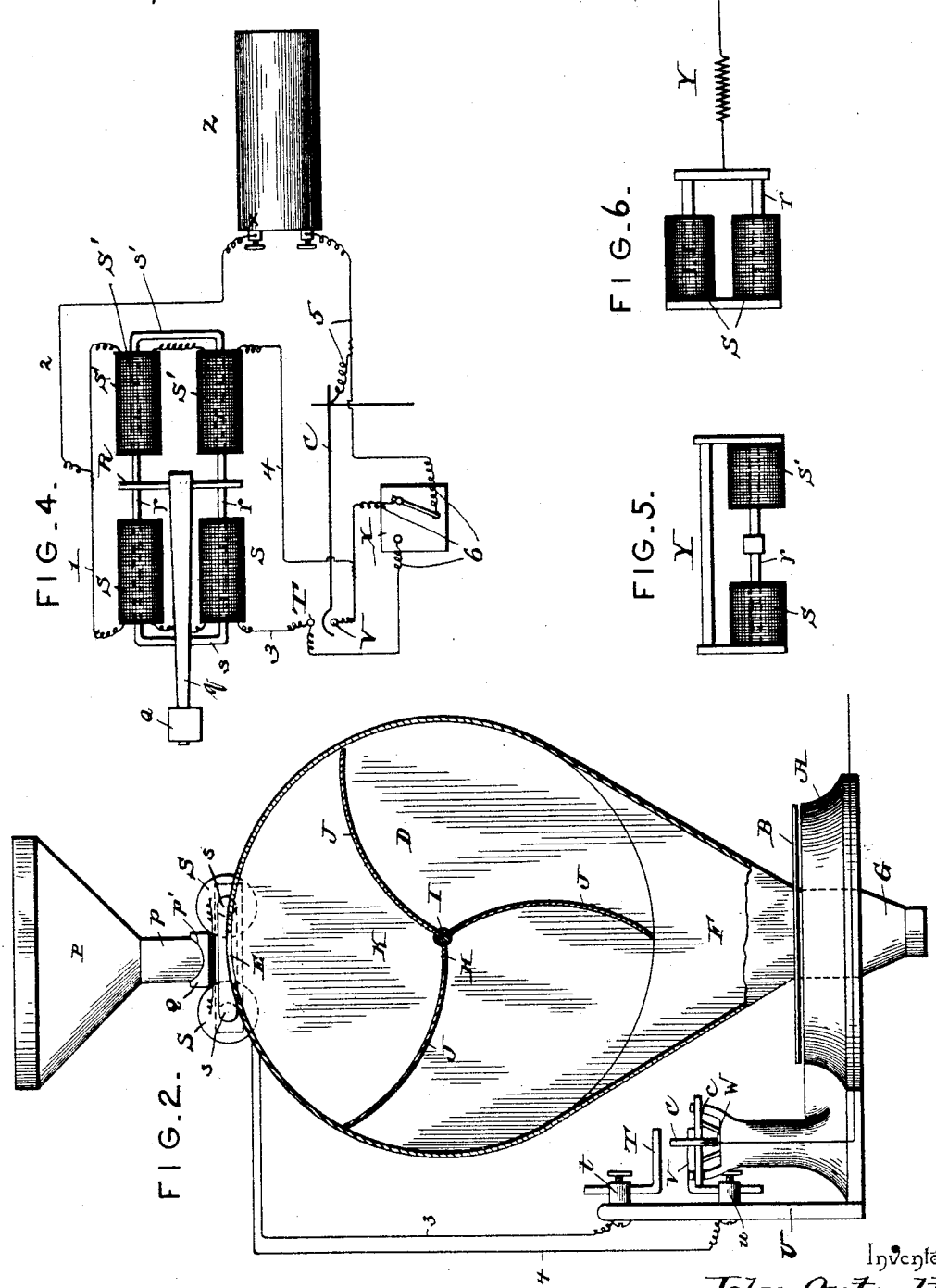
Witnesses
Harry L. Amer.
Inventors
John Outcalt
David DePyster Acker Outcalt.
By their Attorneys.
C. A. Snow & Co.

UNITED STATES PATENT OFFICE.

JOHN OUTCALT AND DAVID DE PYSTER ACKER OUTCALT, OF SPOTSWOOD, NEW JERSEY.

ELECTRIC GRAIN-WEIGHING SCALE.

SPECIFICATION forming part of Letters Patent No. 511,647, dated December 26, 1893.

Application filed July 8, 1893. Serial No. 479,927. (No model.)

*To all whom it may concern:*

Be it known that we, JOHN OUTCALT and DAVID DE PYSTER ACKER OUTCALT, citizens of the United States, residing at Spotswood, in the county of Middlesex and State of New Jersey, have invented a new and useful Electrical Weighing-Scale, of which the following is a specification.

This invention relates to electrical weighing scales; and it has for its object to provide an improved machine of this character whereby any substance either solid or fluid can be accurately and automatically weighed.

To this end the main and primary object of the present invention is to provide certain improvements susceptible to adaptation to ordinary platform scales, and which provide convenient and efficient means for weighing regulated quantities of matter.

With these and other objects in view which will readily appear as the nature of the invention is better understood, the same consists in the novel construction, combination and arrangement of parts hereinafter more fully described, illustrated and claimed.

Figure 3:
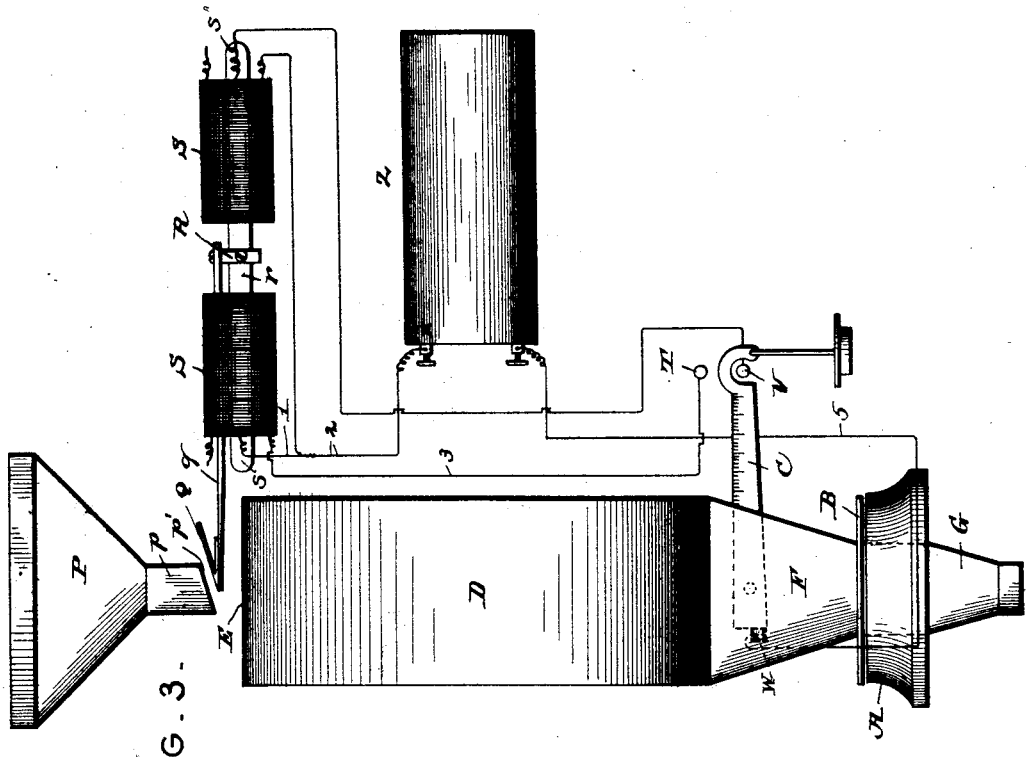
Figure 1:
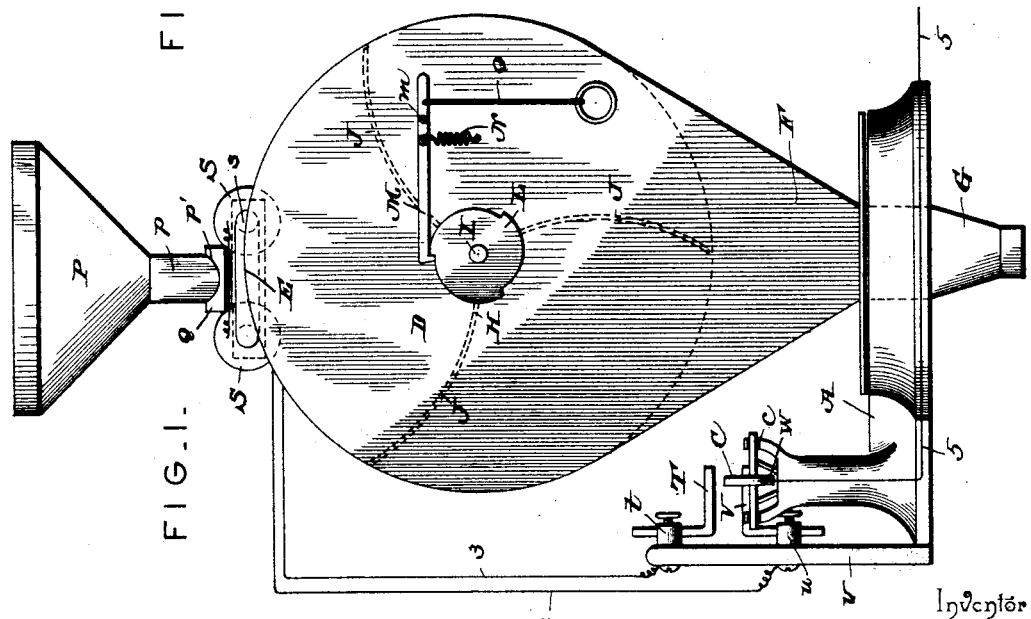

In the accompanying drawings:—Figure 1 is a front view of an electrical weighing apparatus constructed in accordance with this invention. Fig. 2 is a vertical central longitudinal sectional view of the same. Fig. 3 is a side elevation thereof. Fig. 4 is a diagrammatic view of the solenoids and the circuit connections thereof with the scale beam and the battery. Figs. 5 and 6 are detailed modifications of the magnet cut-off operating devices.

Referring to the accompanying drawings, A represents an ordinary construction of platform scales having the scale platform B, and the ordinary scale beam C, located at one side thereof and mounted in the insulated bearings *c*, said scale beam being connected with the ordinary weighing devices of the scales and being set to weigh any desired quantity of matter which is to be weighed by the apparatus herein described.

Suitably mounted on top of the scale platform B, is the cylindrical weighing receptacle or case D. The cylindrical weighing receptacle or case D, is provided with an upper inlet end E, and is tapered at its lower end as at F, and extended into the lower discharge spout G, arranged to project below the scales to discharge the weighed material or substance into any suitable receiving receptacle.

The cylindrical weighing receptacle or case D, accommodates therein a revolving compartment weighing wheel H. The revolving wheel H, is mounted on the wheel shaft I, journaled in the opposite sides of the receptacle or case D, and said wheel comprises a radial series of curved buckets J, extending in close proximity to the rim of the receptacle or case D, and the shape and disposition of these buckets provide for holding the load at one side of the center of the wheel, so that when such wheel is released the compartments K, formed between the buckets J, are relieved of their contents, which are discharged through the discharge spout G. The wheel shaft I, carries at one end the notched stop wheel L, which is adapted to be engaged by one end of the pawl lever M. The pawl lever M, is pivoted at one side of the receptacle or case D, on the pivot *m*, and is normally held in engagement with the shoulders of the stop wheel by the retractile spring N. A pull spring or wire O, is attached to one end of the said lever and provides means for lifting it out of engagement with said stop wheel in order to permit it to allow the contents of the loaded compartments of the weighing wheel to be discharged, but it will of course be understood that any other suitable means, preferably electrical can be employed for lifting this pawl lever if found expedient or desirable.

Arranged directly above and in a line with the upper inlet opening E, of the weighing receptacle or case D, is the feed hopper P, into which the material to be weighed is placed, and said feed hopper is provided at its lower end with a neck *p*, beveled as at *p'*, at its lower extremity. The lower beveled end of the hopper neck is adapted to be covered and uncovered by the inclined cut-off valve or plate Q. The inclined cut off valve or plate Q, is secured to one end of the reciprocating cut off arm *q*, the other end of which is securely attached to the connecting bar or yoke R, which is connected at its ends to the parallel sliding solenoid cores r. The sliding magnet or solenoid cores r, have both ends thereof working inside of the separate and opposite pairs of solenoids S, and S', respectively. Each pair of the solenoids S and S', are suitably supported on their own separate U-shaped yokes s and s', and are arranged with their core openings in alignment with each other, in order to allow the cores to slide freely back and forth in either direction, according to which pair of magnets or solenoids the electric current is passing through. The solenoids S and S', are connected by the single circuit wire 1, which wire has connected thereto one of the battery wires 2, which, for the sake of convenience, may be said to be connected to the positive pole of the battery Z, and the wire connection 1, provides means for closing the circuit over either pair of solenoids S and S', according to the movement of the scale devices. Each of the said pair of solenoids is further provided with the ordinary magnet wires, and the solenoids S, have one of their magnet wires 3, connected to the contact arm T, through the clamp t. The clamp t, is secured to the upper end of a bracket U, arranged adjacent to the scale beam C, and on the same bracket is secured a similar clamp u, which adjustably receives one end of the lower contact arm V, disposed below the upper contact arm T, and forming a space in which plays one end of the scale beam C. A magnet wire 4, leads from the contact arm V, to the other pair of solenoids S'. The main working circuit is completed over the wire 5, connected at one end to the negative pole of the battery Z, and at its other ends by means of a mercury cup connection W, to one end of the scale beam C.

Now it is thought that the operation of the herein-described weighing apparatus will be apparent. Before any material has been fed into the cylindrical weighing receptacle, one end of the scale beam C, rests on the lower contact arm V, thus completing the circuit over the wires 2, 5, and 4 through the pair of solenoids S', which, being therefore active, draw in the cores r, and withdraw the cut-off valve or plate Q, from under the feed hopper, thereby permitting the material to accumulate in the weighing receptacle. When a sufficient quantity of the material has accumulated the scale beam contacts with the upper contact arm T, and closes the circuit over the wires 2, 5 and 3, through the other pair of solenoids S, which are thereby rendered active so as to slide the sliding cores in the other direction and cut off the feed from the hopper, automatically. By now releasing the revolving weighing wheel, the weighed material can be discharged and the apparatus sets itself again to receive another quantity of material.

As shown in the diagram of Fig. 4, a suitable switch circuit 6, may be branched or shunted from the wires 3, 4 and 5 and connected with a switch X, whereby the apparatus may be allowed to freely operate or hold open or closed as will be readily understood.

Various modifications will suggest themselves to those skilled in the art such as shown in Figs. 5 and 6 of the drawings. In Fig. 5, only a single pair of solenoids Y, are employed and having a single intermediate core, and with the proper circuit connections secure the same results as herein specified, while in Fig. 6, one half of the construction herein before described is employed, and a spring Y', used for sliding the cores in one direction, and by the employment of this construction with the proper circuit connections the effective operation of the apparatus will be secured. And we will have it understood that other changes in the form, proportion and the minor details of construction may be resorted to without departing from the principle or sacrificing any of the advantages of this invention.

Having thus described the invention, what is claimed, and desired to be secured by Letters Patent, is—

1. In an electrical weighing apparatus, the combination of a platform scale, a weighing receptacle arranged on the platform of such scale, a feed hopper over the weighing receptacle, separate aligned solenoids with a single intermediate core, a cut-off attached to the solenoid's core, and means for automatically energizing the said solenoids separately, substantially as set forth.

2. In an electrical weighing apparatus, the combination with a platform scale; of a weighing receptacle arranged on the platform of such scale, a feed hopper arranged above said weighing receptacle, separate aligned solenoids with a single core moving therebetween, a cut-off valve or plate connected with said core and adapted to cover and uncover the bottom opening of said hopper, a circuit closer consisting of separated contacts and the scale beam of the scale moving therebetween, separate circuit connections from the separate solenoids to each of the separated contacts, and a battery circuit including therein the solenoids and the scale beam, substantially as set forth.

3. In an electrical weighing apparatus, the combination with a platform scale, of a weighing receptacle mounted on the platform of said scale, a feed hopper arranged over said weighing receptacle, separate pairs of aligned solenoids, connected solenoid cores sliding in either direction according to the activity of the solenoids a cut-off arm attached to said sliding cores and carrying at one end a cut off valve or plate moving under the hopper, a circuit closing device consisting of separate contact arms and the scale beam playing therebetween, a separate circuit connection from each pair of solenoids to one of the contact arms, and a battery circuit including therein both pairs of solenoids and said scale beam, substantially as set forth.

4. In an electrical weighing apparatus, the combination with a platform scale; of a weighing receptacle mounted on the platform of said scale, a feed hopper arranged over the weighing receptacle and having a lower beveled end, separate pairs of aligned solenoids suitably arranged, connected cores for the separate pairs of aligned solenoids said cores sliding in either direction according to the activity of the solenoids, a cut-off arm attached at one end to said sliding cores and carrying at its other end a cut off valve or plate adapted to cover and uncover the lower beveled end of the feed hopper, a circuit closer consisting of separate fixed contact arms and the scale beam of the scales adapted to play therebetween and contact with either one of the same, separate circuit connections from each pair of solenoids to one of the contact arms, and a battery circuit including therein both pairs of solenoids and said scale beam, substantially as set forth.

5. In an electrical weighing apparatus, the combination with a platform scale; of a weighing receptacle mounted on the platform of said scale, a feed hopper arranged over said weighing receptacle, separate aligned solenoids with a single core moving therebetween, a cut-off attached to said core and working under the hopper, a circuit closer consisting of separated contact arms and the scale beam of the scales working between the same, separate circuit connections from the separate solenoids to each contact arm, a battery circuit including therein the solenoids and the scale beam, and a switch having circuit connections with the battery circuit and the separate circuit connections from the separate solenoids, substantially as set forth.

In testimony that we claim the foregoing as our own we have hereto affixed our signatures in the presence of two witnesses.

JOHN OUTCALT.
DAVID DE PYSTER ACKER OUTCALT.

Witnesses:
GEO. G. SLOVER,
GEO. W. DEVOE.